Feb. 18, 1941. A. E. GIACOMINI 2,232,108
OVERHEAD INTAKE FRESH AIR VENTILATING SYSTEM FOR MOTOR VEHICLES
Filed Jan. 12, 1938 2 Sheets-Sheet 1
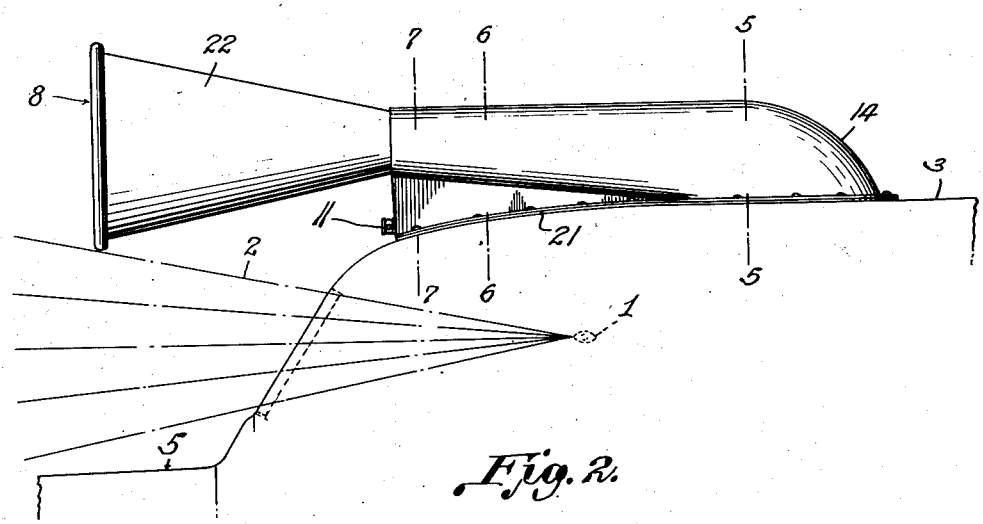
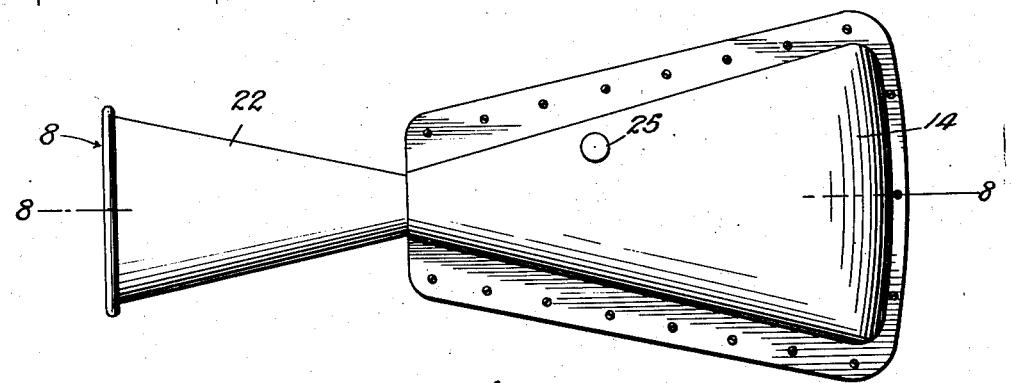
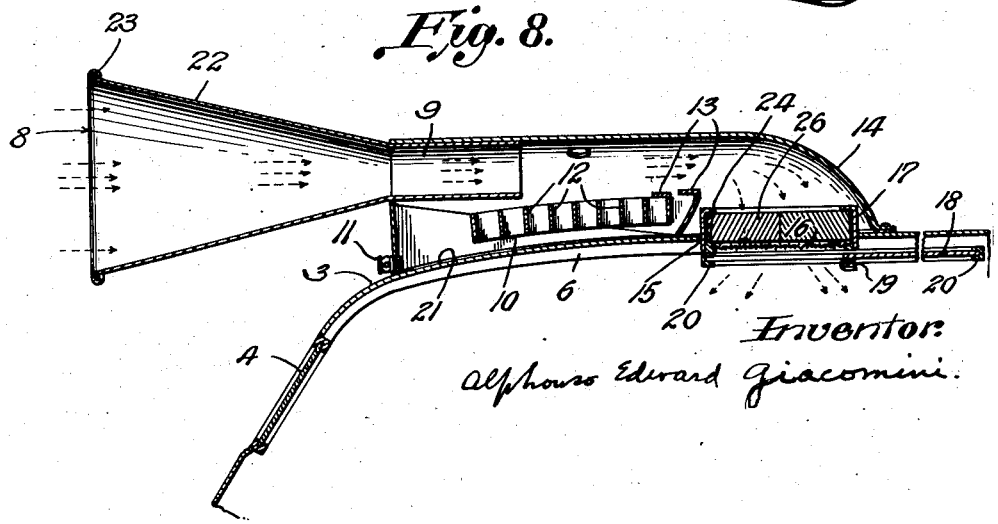

Feb. 18, 1941. A. E. GIACOMINI 2,232,108
OVERHEAD INTAKE FRESH AIR VENTILATING SYSTEM FOR MOTOR VEHICLES
Filed Jan. 12, 1938 2 Sheets-Sheet 2
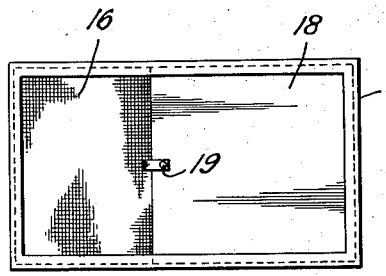
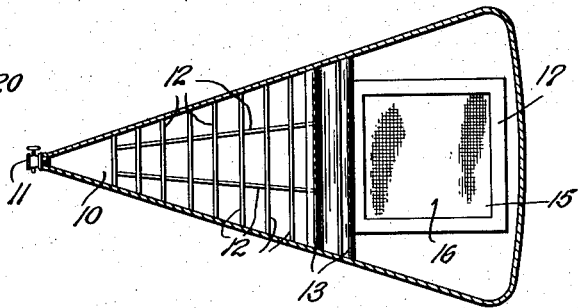
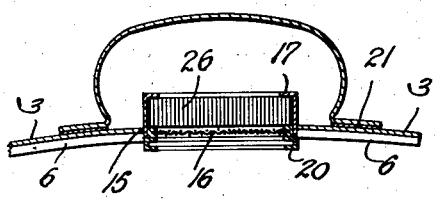
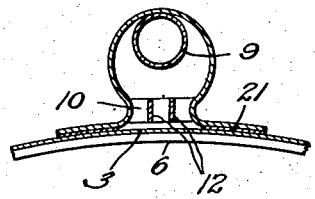
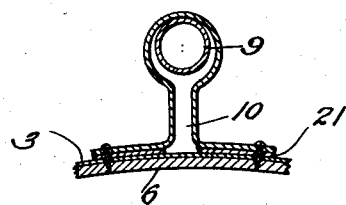
Inventor.
Alphonso Edward Giacomini.

Patented Feb. 18, 1941

2,232,108

UNITED STATES PATENT OFFICE 2,232,108

OVERHEAD INTAKE FRESH AIR VENTILATING SYSTEM FOR MOTOR VEHICLES

Alphonso Edward Giacomini, Thermopolis, Wyo.

Application January 12, 1938, Serial No. 184,613

1 Claim. (Cl. 98—2)

The invention consists of a new type ventilating system for motor vehicles. The main object of the invention is to furnish the occupants of the vehicle with an abundant, continuous supply of fresh air that is free from carbon monoxide and other exhaust engine gases.

The main feature of the invention is the location of the intake. It is up high where only relatively fresh air can be found and far enough ahead to eliminate any possibility of picking up exhaust gases from one's own engine or exhaust pipe. Should there be sewer gas near the pavement or exhaust gases from other vehicles on the road, same will be very much diffused before reaching the level of the intake. Even where these exist to some degree, any that may come in will soon be expelled as a continuous stream of air is coming in all the time.

It works equally as well in rain or snow storm as it does in fair weather. It also eliminates dust, bugs, and pollen. Humidity with cooled air or iced air can be had if wanted. It produces a slightly higher pressure in the vehicle than the air outside and thereby excludes any exhaust gases that may follow the car and enter by suction. It has no mechanical devices or moving parts to get out of order and, therefore, nothing to grease or oil. When once attached to the roof it is always ready and works as soon as the vehicle begins to move. The only items that need any attention are the air filters, which have to be changed or cleaned about once a year, and if humidity and cooling or iced air is wanted, the water pan has to be filled as required and drained in extremely cold weather to prevent freezing.

The drawings consist of Sheets 1 and 2. On Sheet 1 is Figure 1 side view; Figure 2 top view. On Sheet 2 is Figure 3, view on ceiling; Figure 4, view on inside of ventilator; Figure 5 is a vertical sectional view taken on line 5—5 of Fig. 1.

Fig. 6 is a view taken on line 6—6 of Fig. 1.

Fig. 7 is a view taken on line 7—7 of Fig. 1.

Fig. 8 is a vertical sectional view taken on line 8—8 of Fig. 2.

The horn is set out over the hood far enough ahead to avoid getting any air that has gone over the engine so that the air entering the horn will not have any engine heat, smell, or smoke or engine paint or burning grease or any exhaust gases should there be an unnoticed leak in any of the engine gaskets. The front end of the horn is set high enough so that it is above the view of the driver's eye 1 as shown by the dotted lines 2 Figure 1 giving the direction of sight.

The car roof 3, car windshield 4, part of hood 5, and driver's eye 1 shown on Figure 1 are not a part of the invention but are there simply to show the location of the device on a vehicle. Likewise, the car roof 3, and ceiling 6 shown on Figure 7 and Figure 8 form no part of the invention. The device can be fitted to the roof of any motor vehicle.

The air enters the horn 22 at the front as shown on Figure 8 by dotted lines with arrows. The motion of the vehicle forces it into the horn so as to form a pressure. The intake end 8 is large and as it is forced into a smaller pipe 9 at its end, it is under compression and remains under compression as it passes through the smaller pipe 9. This pipe 9 extends into the main air chamber for a short distance in order to give enough pressure to overcome any back pressure and keep the air inside the vehicle under a slightly higher pressure than the air outside. This slight excess pressure forces air out through all leakage points around doors, windows, etc. By keeping a steady outflow, no exhaust gases or fumes can be brought into the vehicle by suction. The pipe 9 is also shown on Figures 6 and 7. As the air leaves this pipe 9 it passes over the water pan 10. This pan can be filled with water or left empty as desired. The pan can be filled with water through a hole with screw cap cover 25 in the top of the air chamber on one side. When filled, it will furnish humidity and by the principle of rapid evaporation producing cold, cool the temperature inside a few degrees. If iced air is wanted, ice cubes can be introduced into the air chamber by dropping them into the hole with screw cap cover 25. They will land on the baffles 12, or between the baffles in the pan 10, and melt. This hole is large enough to admit standard size ice cubes. For busses and other large vehicles, a larger hole can be used so as to admit ice in large pieces that will last longer. If no humidity or cooling is wanted, any water that is on hand in the pan can be drained out by means of the pet cock 11 located at the lower front end of the device. This pet cock 11 also serves as a clean out plug to flush out accumulated dust and dirt. The pet cock 11 is shown on Figures 1, 4 and 8. After passing over the water pan 10 Figure 8 the air goes straight back and is evenly deflected downwards by the curved back of the air chamber 14 toward the opening in the roof 15. This opening is covered by filters 26 which remove all dust pollen, etc. as the air passes through them. The air then starts its journey downward and sideways through the air space in the vehicle and finally escapes through the crevices around doors, windows, etc.

The water pan is fitted with baffle plates 12 as shown on Figure 4. They are kept clear of the bottom so that the water can circulate. The two rear baffle plates 13 are hook shaped on top to prevent any water splashing out on the filters. In cold weather, water pan 10 can be drained through pet cock 11 to prevent freezing.

A screen made of ordinary hardware wire 16 is placed flush with the ceiling over opening 15. The screen is fitted with a narrow frame 24 which keeps the filters a small distance in the clear, and thus protects the filters from damage and the occupant's headgear from coming in contact with them. This screen 16 is shown in full view on Figure 3 and in section on Figures 5 and 8.

The frame 17 that holds the filters is made of sheet metal and is shown on Figures 4, 5 and 8. The frame is a part of the invention but the filters are not, since any good air conditioning filter made as specified below can be used. By using a filter with slanting tubular shaped cells the air can be deflected toward the occupants of both the front and rear seats of a two or more seated vehicle. This is done by cutting the filter in two and setting the cells in the required directions.

In case the air comes in too strong under excessive high speeds or in extremely cold weather, it can be cut down to the desired amount by closing the slide 18 shown on Figure 3. This holds by friction at any point desired or can be held open securely by the button on the clasp 19 shown on Figures 3 and 8. The slide 18 and the cover over same 20 is made of composition board. Any strong hard pressed thin composition board may be used as the manufacture of the composition board is not a part of the invention.

The entire device is fitted to the roof with a gasket 21 between to keep it both air and water tight. This is shown on Figure 7 for a steel roof. For a composition roof it would be applied with flashing cement.

To make the device work properly all doors and windows are kept tightly closed and all holes of any consequence sealed. The air is forced out through all cracks around doors, windows, etc. and no special exhaust openings are required.

The drawings as shown are made to a scale of 1½ inches to the foot, this being the proper size for a two seated car. For a one seated car and small trucks it can be made proportionately smaller and for large trucks, busses, or other motor vehicles, proportionately larger.

The device is made of 28 gauge iron. All inside sheets are galvanized to prevent rust. Sheets galvanized on one side are preferred for the outside members as it is painted on the outside the same color as the body of the vehicle or the same color as the roof in the case of a steel roof. By using this gauge metal and the shape shown it is self supporting without any unsightly braces or supports and when properly attached to the roof is as strong as any other part of the body. The intake horn 22 as shown on Figures 1, 2, and 8 has a ¼ inch iron rod 23 rolled in it to stiffen the outside edge.

The shape of the device back of the horn is such as not to cause any eddy currents to whip ahead into the horn or friction of the air to reduce the speed of the car.

I am aware that prior to my invention a great many ventilating systems were put on the market. Therefore, I do not claim to have the first ventilating system, but as the inventor has been badly gassed none of the ventilating systems that I encountered proved to be gas proof enough for me.

I claim:

A ventilating device mounted on the roof of a vehicle, having an intake funnel, the front end of said funnel being located far enough ahead of the top part of the vehicle, so as to preclude the possibility of any air that passes over the engine, or engine hood, getting into said intake funnel, and said funnel located high enough so that it will not pick up any bad air that hovers near the ground, or exhaust gases from other vehicles, without said exhaust gases being somewhat diffused, said location also being above the driver's scope of vision, a plenum chamber with a short tube secured in the top of said chamber, said tube running longitudinally with the vehicle, the front end of said tube being attached to the rear end of said intake funnel, and to the front end of said plenum chamber, the rear end of said tube opening into the central portion of said plenum chamber, the top of said plenum chamber spreading out in width at its rear end and being streamlined down to the roof of the vehicle, so as not to produce any eddy currents of the air that passes around the vehicle on the outside, and to give curves on the inside that will produce the least possible friction of the air passing through said chamber, means for attaching said device rigidly to the roof of the vehicle, and means for making the connection at said attachment both air and watertight, means in top on one side of said device to place water and ice cubes into said plenum chamber, and means within said chamber to hold ice for cooling and water for humidifying and cooling the air passing through said chamber, and means for draining the water from said chamber to prevent freezing in cold weather, and for cleaning said chamber, a hole in the roof of the vehicle, said hole being located so as to open into the rear end of said plenum chamber to form an inlet opening in the ceiling of said vehicle, a frame in said inlet opening, a filter mounted in said frame, a screen on the bottom of said frame to protect said filter, means to prevent water for humidifying and cooling purposes from splashing on said filter, and manually operable means for controlling the flow of air into the vehicle through the inlet opening in said frame.

ALPHONSO EDWARD GIACOMINI.